(12) United States Patent  (10) Patent No.: US 8,556,774 B2
Morita  (45) Date of Patent: Oct. 15, 2013

(54) DEVICE FOR CONTROLLING AUTOMATIC START OF ENGINE MOUNTED ON VEHICLE WITH MANUAL TRANSMISSION

(75) Inventor: Tetsuo Morita, Nagoya (JP)

(73) Assignee: Denso Corporation, Kariya (JP)

( * ) Notice: Subject to any disclaimer, the term of this patent is extended or adjusted under 35 U.S.C. 154(b) by 115 days.

(21) Appl. No.: 13/236,981

(22) Filed: Sep. 20, 2011

(65) Prior Publication Data

US 2012/0071298 A1  Mar. 22, 2012

(30) Foreign Application Priority Data

Sep. 21, 2010  (JP) ................. 2010-210480

(51) Int. Cl.
*B60K 23/00* (2006.01)
*B60K 26/00* (2006.01)
*B60K 26/02* (2006.01)
*B60W 10/02* (2006.01)
*B60W 10/04* (2006.01)

(52) U.S. Cl.
USPC ............ 477/167; 477/173; 477/174; 477/181

(58) Field of Classification Search
USPC ............... 477/167, 170, 173–175, 180, 181
See application file for complete search history.

(56) References Cited

U.S. PATENT DOCUMENTS

| | | | | |
|---|---|---|---|---|
| 4,362,133 A | * | 12/1982 | Malik | 477/99 |
| 6,371,889 B1 | * | 4/2002 | Kuroda et al. | 477/181 |
| 6,504,259 B1 | * | 1/2003 | Kuroda et al. | 290/40 C |

| | | | | |
|---|---|---|---|---|
| 2003/0224902 A1 | * | 12/2003 | Kahlon et al. | 477/3 |
| 2004/0194749 A1 | | 10/2004 | Yonezawa et al. | |
| 2006/0144361 A1 | | 7/2006 | Freisinger et al. | |

FOREIGN PATENT DOCUMENTS

| | | |
|---|---|---|
| DE | 103 07 377 A1 | 9/2004 |
| DE | 10 2008 013 410 A1 | 9/2009 |
| EP | 1 657 436 A2 | 5/2006 |
| EP | 2 223 835 A2 | 9/2010 |
| JP | A-2006-138221 | 6/2006 |
| JP | A-2009-30502 | 2/2009 |

OTHER PUBLICATIONS

European Search Report issued in European Application No. 11181485.1 dated Nov. 9, 2012.

* cited by examiner

*Primary Examiner* — Tisha Lewis
(74) *Attorney, Agent, or Firm* — Oliff & Berridge, PLC

(57) ABSTRACT

A device for controlling an automatic start of the engine mounted on a vehicle which includes a clutch to transmit/block motive power between an output shaft of the engine and the driving wheel of the vehicle. The automatic start control device includes an automatic restart processing in which a starter is driven to crank the engine when predetermined restart conditions are met thereby restarting the engine. The automatic start control device detects a state of the clutch being either transmitting or blocking and detects whether or not a transition of the state occurs during the cranking of the engine in the automatic restart processing. The control device forcibly stops driving of the starter when the transition of the state occurs.

5 Claims, 8 Drawing Sheets

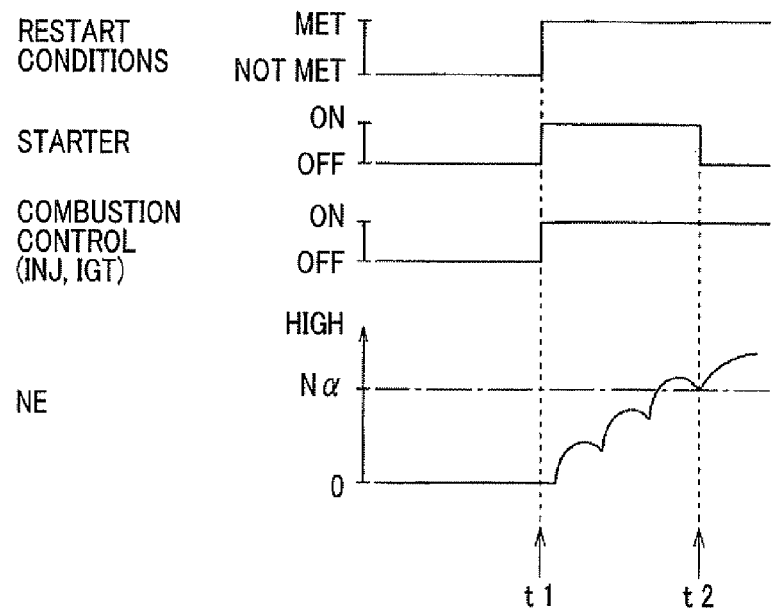
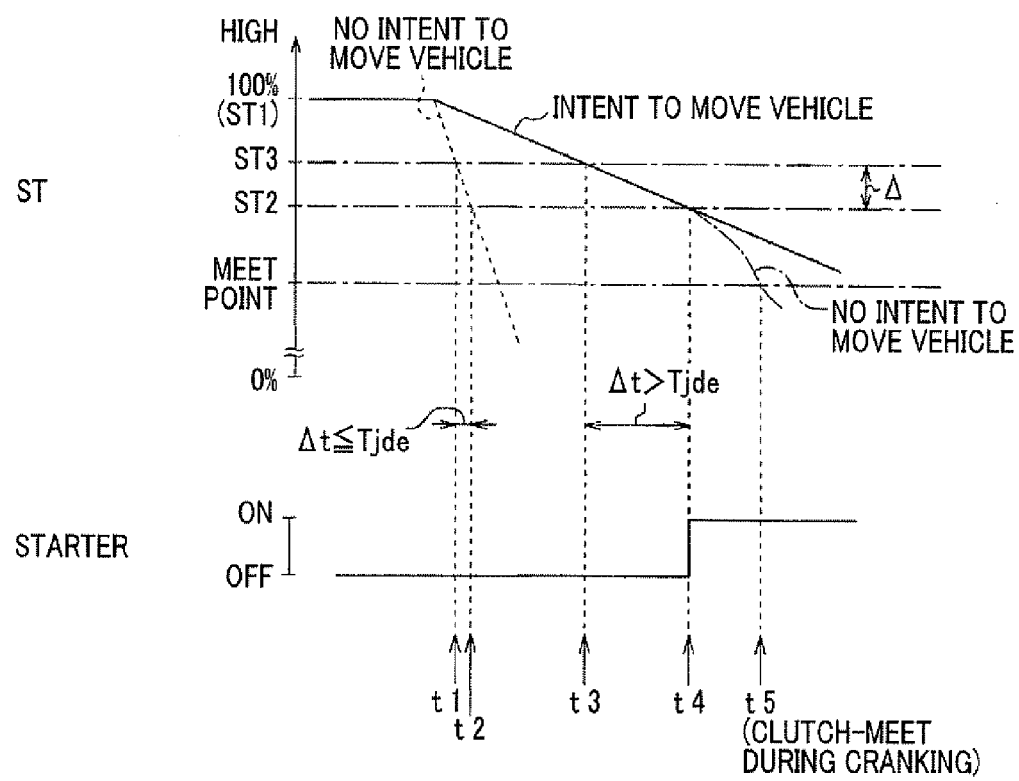

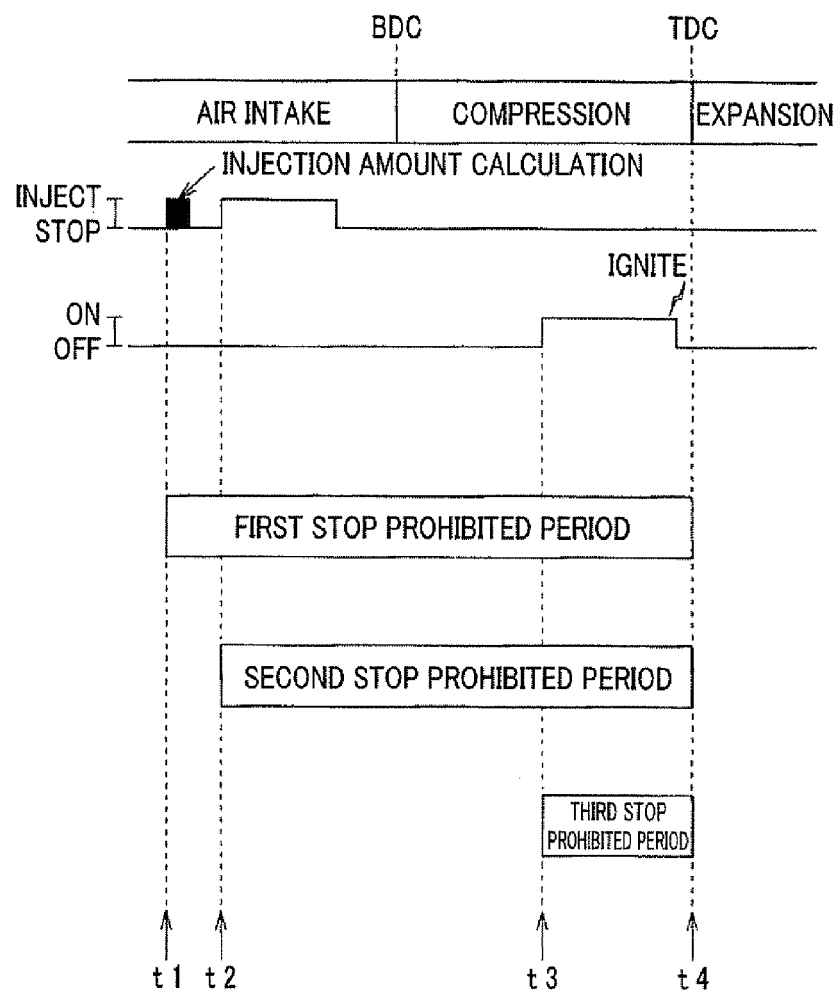

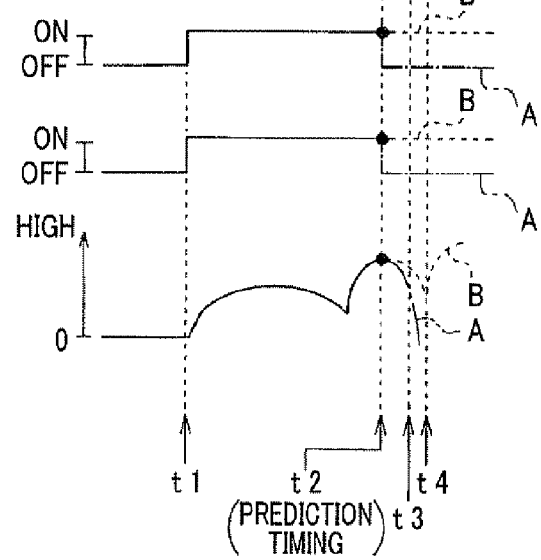

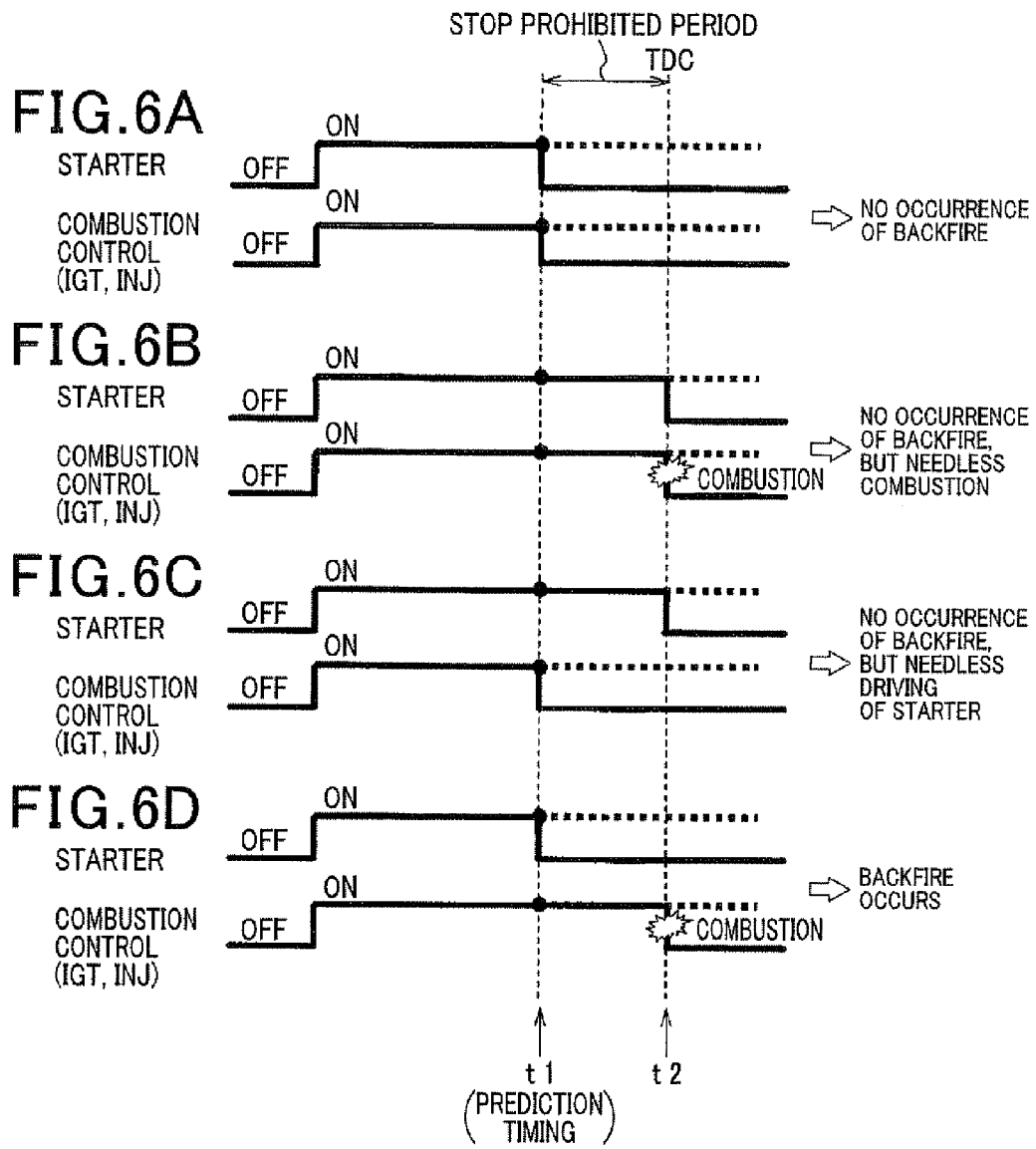

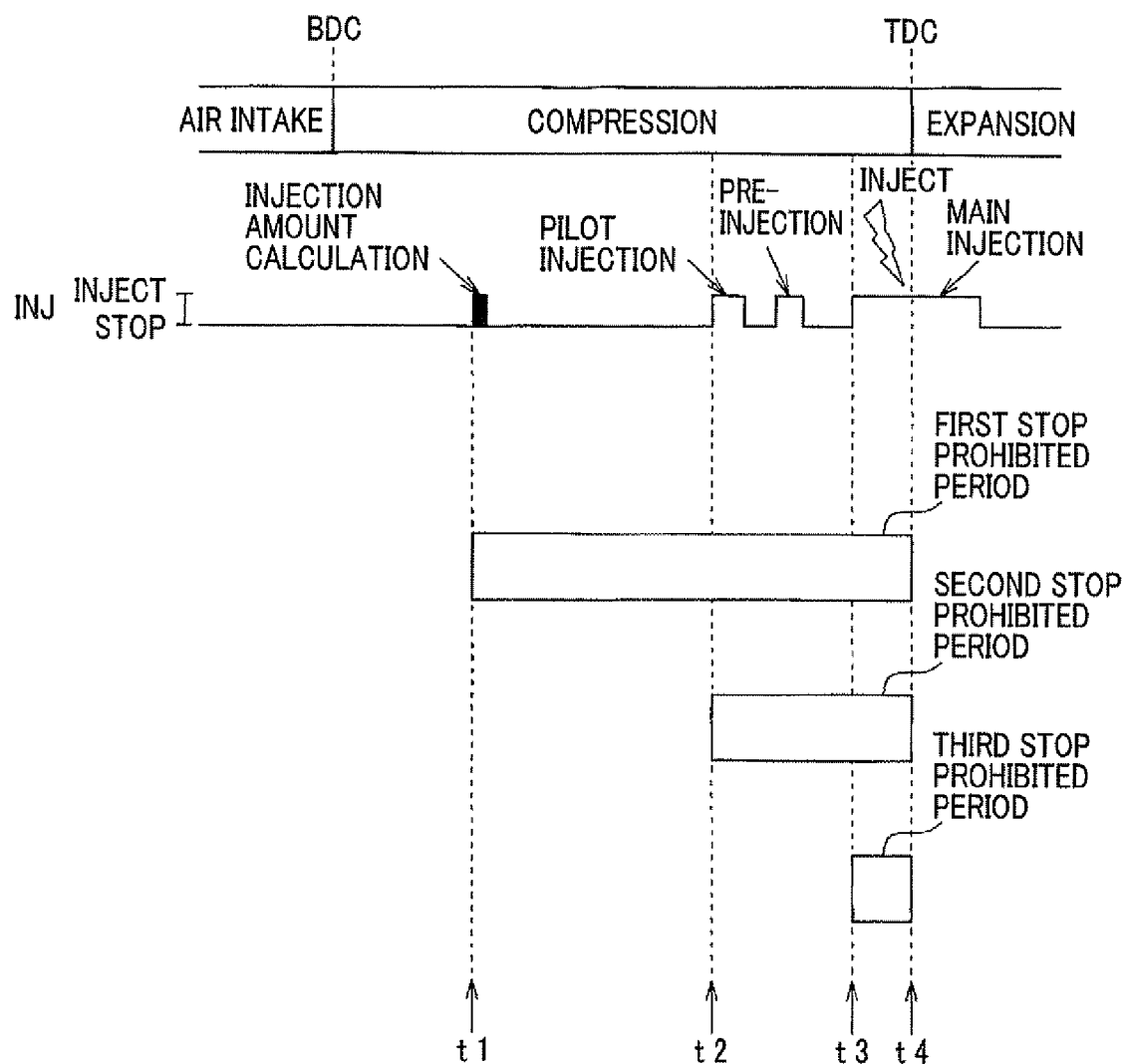

DEVICE FOR CONTROLLING AUTOMATIC START OF ENGINE MOUNTED ON VEHICLE WITH MANUAL TRANSMISSION

CROSS REFERENCE TO RELATED APPLICATION

This application is based on and claims the benefit of priority from earlier Japanese Patent Application No. 2010-210480 filed on Sep. 21, 2010 the description of which is incorporated herein by reference.

BACKGROUND

1. Technical Field

The present invention relates to device for controlling automatic start of an engine mounted on a vehicle. In particular, the present invention relates to a device for controlling automatic start of an engine mounted on a vehicle provided with a manual transmission.

2. Description of the Related Art

In recent years, idle-stop control, where restart operation is performed after an engine mounted on a vehicle has been automatically stopped, is known. For example, JP-A-2006-138221 discloses an idle-stop control in which a process for automatically stopping the engine is performed when predetermined stop conditions are met. Then, when predetermined restart conditions are subsequently met, initial rotation is applied to an output shaft of the engine (cranking is performed) by the starter being driven, thereby restarting the engine. As a result of this control, the fuel efficiency can be enhanced.

In a vehicle with a manual transmission including the clutch that transmits or blocks motive power between the output shaft and the driving wheel by the driver operating the clutch operating member, the following are proposed as the restart conditions for the engine: conditions including a condition that, under a circumstance in which the clutch is blocking the motive power between the output shaft and the driving wheel, the clutch operating member is operated such that the motive power is transmitted between the output shaft and the driving wheel; and conditions including a condition that, under the above-described circumstance in which the motive power is blocked, brake operation is released.

In more detail, when the above-described conditions involving clutch operation and brake operation are used as the restart conditions, a situation may occur in which the motive force is transmitted from the output shaft to the driving wheel during a period in which cranking is being performed by the process for restart, depending on the operation aspect of the clutch operating member by the driver after the restart conditions are met. In this instance, as a result of the driving force of the starter being transmitted to the driving wheel and used for power-running the vehicle, defects may occur such as movement of the vehicle at an unintended timing or reduced reliability of the starter.

SUMMARY

An embodiment provides a device for controlling an automatic start of an engine capable of favorably suppressing occurrence of defects during engine restart of a vehicle with a manual transmission.

A first aspect of the embodiment is a device for controlling an automatic start of an engine mounted on a vehicle. The vehicle is provided with a clutch producing two states including a transmitting state where a motive power is transmitted to a driving wheel of the vehicle from an output shaft of the engine by operating a clutch member operated by a driver and a blocking state where the motive power is blocked between the output shaft and the driving wheel by operating the clutch member operated by the driver, and a brake to stop wheels including the driving wheel from rotating by a braking operation of a brake member. The device includes an automatic restart processing adapted to restart the engine by driving a starter to perform cranking the engine, the automatic restart processing being performed when predetermined restart conditions are met during automatic stop of the engine; determining means for determining whether or not a transition of the state from the blocking state to the transmitting state occurs while the cranking is being performed, based on a state of the clutch member after the cranking is started by the automatic restart processing during the blocking state; and forced stopping means for forcibly stopping driving of the starter when the determining means determines the transition of the state. The restart condition includes a condition in which the clutch member is operated to allow the state of the clutch to be the transmitting state during the blocking state and a condition in which the braking operation of the brake member is released during the blocking state.

In the above-described embodiment, driving of the starter is forcibly stopped when it is judged that the state of the clutch transitions from the state (motive power blocked state) blocking the motive power between the output shaft and the driving wheel to the state transmitting motive power (clutch-meet state) during the period in which cranking is performed by the process for restarting the engine. As a result, use of driving force of the starter for power-running of the vehicle can be suppressed. In addition, the occurrence of defects, such as the vehicle moving at an unintended timing and reliability of the starter decreasing, can be favorably suppressed.

A second aspect of the embodiment is the embodiment according to the first aspect, in which the process for restarting the engine is a process for performing cranking, and a combustion control process including at least a process for supplying fuel to a combustion chamber of the engine from a fuel injection valve. The forced stopping means forcibly stops both driving of the starter and the combustion control process when the determining means determines that the state transitions to the state transmitting motive force.

In the above-described embodiment, the combustion control process is performed as the process for restarting the engine. The combustion control process is ordinarily performed such that the pressure (cylinder internal pressure) within the combustion chamber reaches maximum after a compression upper dead point by explosive force generated by combustion of the fuel. Even when driving of the starter is stopped by the forced stopping means, the rotation of the output shaft is not immediately stopped. The output shaft continues rotating by inertia while reducing rotation speed as a result of pumping loss and the like. Under such circumstances, when the combustion control process is continued, the timing at which the cylinder internal pressure reaches maximum may shift from the timing after the compression upper dead point to a timing before the compression upper dead point as a result of the ignition timing being shifted to the advance side by the decrease in rotation speed of the output shaft. In this instance, because the explosive power applied to the output shaft is power in a direction rotating the output shaft in reverse, a phenomenon may occur in which the output shaft rotates in reverse (backfire). When the motive power between the starter and the output shaft is not blocked under such circumstances, reliability of the starter may decrease as a result of the power attributed to backfire being transmitted from the output shaft to the starter.

Regarding this point, in the above-described embodiment, driving of the starter and the combustion control process are both forcibly stopped when the determining means determines that the operating state of the clutch transitions to the clutch-meet state. As a result, the occurrence of backfire can be suppressed, and reduction in reliability of the starter can be suppressed.

A third aspect of the embodiment is the embodiment according to the second aspect, further including a setting means for setting a stop prohibited period including a period from a timing at which ignition of the fuel supplied from the fuel injection valve cannot be stopped to a timing at which a compression upper dead point is reached. The determining means includes predicting means for predicting whether or not the operating state of the clutch will transition from the state blocking the motive power to the state transmitting the motive power during the stop prohibited period. The forced stopping means forcibly stops both driving of the starter and the combustion control process before the stop prohibited period when the predicting means predicts that the operating state will transition to the state transmitting motive power.

When the operating state becomes the clutch-meet state during the period from the timing at which ignition of the fuel supplied from the fuel injection value cannot be stopped to the timing at which a compression upper dead point is reached, when driving of the starter is stopped, backfire may occur as a result of the timing at which the cylinder internal pressure reaches maximum shifting to a timing before the compression upper dead point, as a result of the decrease in rotation speed of the output shaft and the like. Regarding this point, in the above-described embodiment, as a result of the setting means and the predicting means being included, a situation in which backfire may occur can be appropriately recognized in advance. When the transition of the operating state of the clutch to the clutch-meet state during the stop prohibited period is predicted, driving of the starter and the combustion control process are both forcibly stopped according to the above-described aspect. As a result, the occurrence of backfire is prevented. In addition, defects, such as driving of the starter and the combustion control process being needlessly continued, can be prevented.

A fourth aspect of the embodiment is the embodiment according to the third aspect, in which the engine is a spark-ignition engine including an ignition device. The ignition device energizes a primary coil of an ignition coil and then stops energization. Induced electromotive force is then generated in a secondary coil of the ignition coil, thereby generating a discharge spark in a spark plug. The combustion control process includes a process in which an operation is performed to energize the ignition device to generate the discharge spark in the spark plug during a compression step. The setting means sets a stop prohibited period including a period from a timing at which energization of the primary coil is started to a timing at which a compression upper dead point is reached.

When energization of the primary coil of the ignition device is once started, even when the energization is subsequently blocked, the discharge spark may be generated in the spark plug during blocking. Therefore, in the above-described embodiment, the period from the timing at which energization of the primary coil of the ignition device is started is set as the stop prohibited period. The end timing of the stop prohibited period is set to the compression upper dead point or after the compression upper dead point because the risk of backfire is eliminated as a result of the compression upper dead point being reached.

A fifth aspect of the embodiment according to the third aspect, in which the engine is a compression-ignited engine. The setting means sets a stop prohibited period including a period from a timing at which supply of fuel contributing to the generation of torque in the engine is started by the process for supplying fuel and to the timing at which a compression upper dead point is reached.

The engine ordinarily starts fuel injection that contributes to the generation of torque in the engine from the fuel injection valve at a timing earlier than the compression upper dead point in the compression step. Once the fuel is injected, ignition of the fuel cannot be stopped. Therefore, in the above-described embodiment, the period from the timing at which the supply of fuel is started is set as the stop prohibited period. The end timing of the stop prohibited period is set to the compression upper dead point or after the compression upper dead point because the risk of backfire is eliminated as a result of the compression upper dead point being reached.

A sixth aspect of the embodiment is the embodiment according to the first aspect, in which the transition of the operating state of the clutch from the state blocking motive power to the state transmitting motive power indicates the start of transition of motive power between the output shaft and the driving wheel by the clutch.

In the above-described embodiment, driving of the starter is forcibly stopped when a judgment is made that the transmission of motive power from the output shaft to the driving wheel is started by the clutch. As a result, the use of driving force of the starter for power-running of the vehicle can be appropriately prevented. The occurrence of defects, such as the vehicle starting to move and reliability of the starter decreasing, can be favorably prevented.

A seventh aspect of the embodiment is the embodiment according to the first aspect, in which the process for restarting the engine performs cranking by driving the starter until a judgment is made that the rotation speed of the output shaft is a rotation speed or more, the rotation speed being that enabling continued rotation of the output shaft by only torque generated by combustion of fuel supplied to a combustion chamber of the engine.

In the above-described embodiment, cranking is performed according to the above-described aspect to appropriately restart the engine. When the motive power is transmitted from the output shaft to the driving wheel by the clutch during the period in which cranking is performed, the time required for the rotation speed of the output shaft to reach the above-described rotation speed (self-sustained drive enabling speed) or more, the rotation speed being that enabling continued rotation by only the generated torque, after the start of cranking increases as a result of force in the direction obstructing the forward rotation of the output shaft being applied to the output shaft and the degree of increase in the rotation speed of the output shaft decreasing and the like. In this instance, as a result of the drive time of the starter increasing, the degree of reduction in reliability of the starter may increase. Therefore, the forced stopping means is advantageous in the above-described embodiment in which the degree of reduction in reliability of the starter may increase as a result of the motive power being transmitted between the output shaft and the driving wheel during the period in which cranking is performed.

BRIEF DESCRIPTION OF THE DRAWINGS

In the accompanying drawings:

FIG. 2 is a diagram showing an overview of an engine restart process according to the first embodiment;

FIG. 3 is a diagram showing an overview of engine restart conditions according to the first embodiment;

FIG. 4A and FIG. 4B are diagrams showing an overview of a stop prohibited period according to the first embodiment;

FIG. 5A to FIG. 5D are diagrams showing a prediction process according to the first embodiment;

FIG. 6A to FIG. 6D are diagrams showing a method for deciding a stop timing of a starter and combustion control according to the first embodiment;

FIG. 9 is a diagram showing an overview of a stop prohibited period according to the second embodiment.

DETAILED DESCRIPTION OF THE PREFERRED EMBODIMENTS

First Embodiment

With reference to FIGS. 1 to 7, hereinafter will be described a first embodiment according to the present invention.

In the first embodiment, a control device 5 is applied to a vehicle in which a manual transmission is mounted.

Figure 1:
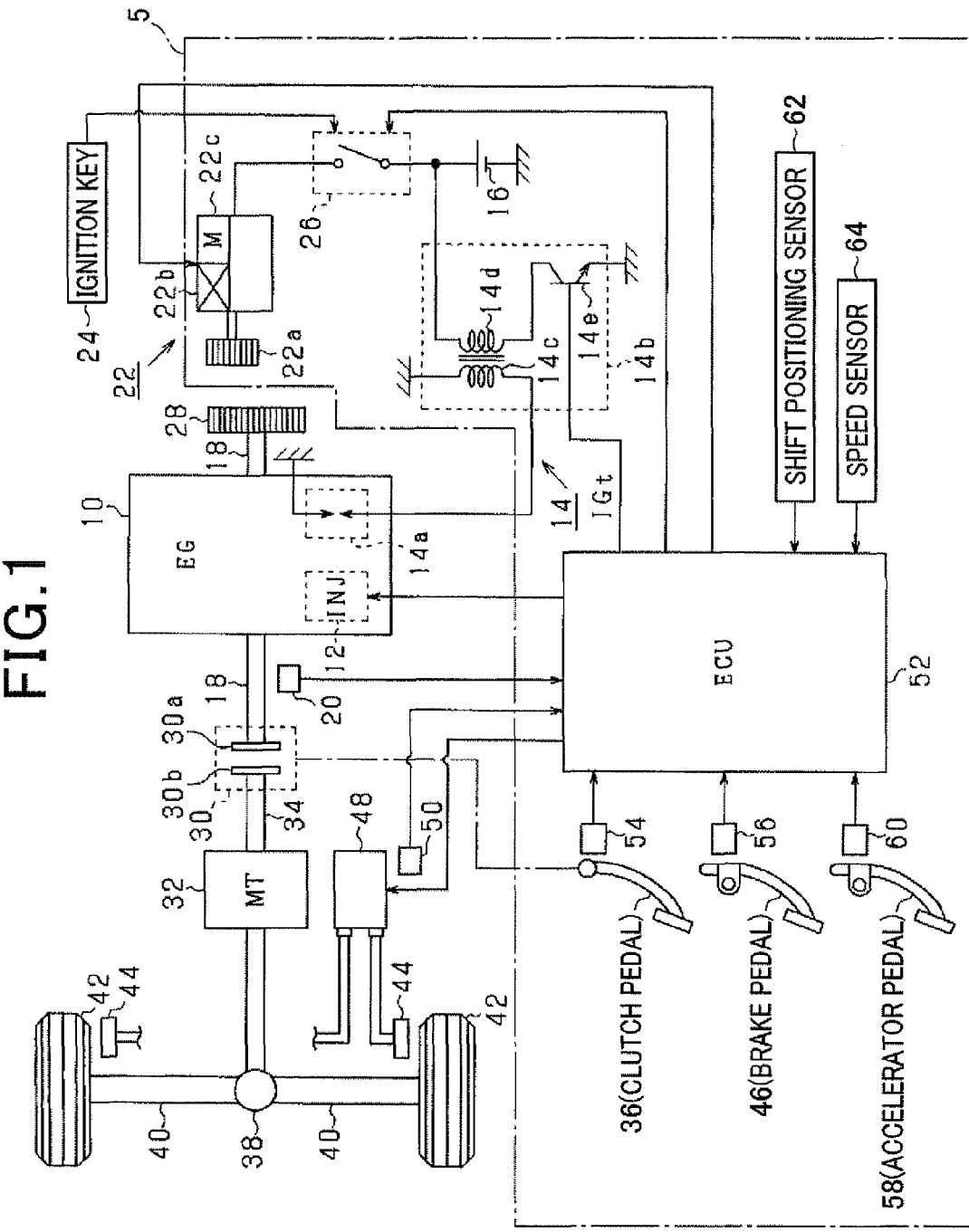
FIG. 1 is a system configuration diagram according to a first embodiment.

FIG. 1 is a system configuration diagram according to the first embodiment.

An engine 10, shown in FIG. 1, is a multiple-cylinder spark-ignition internal combustion engine. According to the first embodiment, the engine 10 is assumed to be a gasoline direct-injection engine. Specifically, each cylinder of the engine 10 includes a fuel injection valve 12 and an ignition device 14. The fuel injection valve 12 supplies fuel (gasoline) to a combustion chamber of the engine 10 by direct injection. The ignition device 14 generates a discharge spark in the combustion chamber.

The ignition device 14 is configured to include a spark plug 14a and an ignition coil 14b. Specifically, one end of a secondary coil 14c configuring the ignition coil 14b is connected to the spark plug 14a. The other end of the secondary coil 14c is grounded. In addition, one of a primary coil 14d configuring the ignition coil 14b is connected to a 12V battery 16. The other end of the primary coil 14d is grounded with a collector and an emitter of a power transistor 14e therebetween.

In a configuration such as that described above, when the power transistor 14e is turned ON by an ON ignition signal inputted into the base of the power transistor 14e, a primary current supplied from the battery 16 flows into the primary coil 14d. After energization of the primary coil 14d, when the power transistor 14e is turned OFF by an OFF ignition signal and the current to the primary coil 14d is blocked, a high voltage is induced in the secondary coil 14c. A discharge spark is generated between a center electrode and a ground electrode of the spark plug 14a. As a result, an air-fuel mixture of the fuel supplied by injection from the fuel injection valve 12 and intake air are combusted. Then, the energy generated by combustion of the fuel is extracted as rotative power of an output shaft (crank shaft 18) of the engine 10.

A crank angle sensor 20 that detects a rotation angle of the crank shaft 18 is provided near the crank shaft 18. According to the first embodiment, the crank angle sensor 20 is assumed to have a function enabling a rotation angle position of the crank shaft 18 to be determined every time by enabling a rotation direction of the crank shaft 18 to be determined. This function is provided such that the rotation angle position of the crank shaft 18 can be recognized every time. The rotation angle position serves as information required for fuel injection control during restart and the like, to enable quick restart of the engine 10 that has been automatically stopped by idle-stop control, described hereafter.

A starter 22 applies initial rotation to the crank shaft 18 (performs cranking). The starter 22 is configured to include a pinion 22a, an actuator (switch section 22b), a motor 22c, and the like. The actuator is electromagnetically driven and pushes out the pinion 22a. The motor 22c rotatably drives the pinion 22a. The starter 22 is driven using the battery 16 as a power supply source, as a result of a starter switch 26 being turned ON by a rotation operation of an ignition key 24 by the driver or the like. Specifically, when the switch section 22b is energized, the pinion 22a is pushed outwards towards a ring gear 28 that is mechanically coupled with the crank shaft 18. The pinion 22a and the ring gear 28 then mesh. When the motor 22c is energized, the pinion 22a is rotatably driven, and cranking is performed as a result. When the energization of the switch section 22b is stopped, the pinion 22a is displaced in a direction away from the ring gear 28. As a result, the meshing between the pinion 22a and the ring gear 28 is released.

The rotative power of the crank shaft 18 is transmitted to a manual transmission (MT 32) via a clutch device 30. The clutch device 30 is configured to include a circular plate 30a (such as a flywheel) connected to the crank shaft 18 and a circular plate 30B (such as a clutch disk) connected to an input shaft 34 of the MT 32. Depending on a depressing operation of a clutch pedal 36 by the driver, the circular plates 30a and 30b switch between a contacting state and a separated state. According to the first embodiment, a pedal depression amount (clutch stroke) in a state in which the clutch pedal 36 is completely depressed is 100%. The clutch stroke in a state in which the depressing operation of the clutch pedal 36 is released is 0%. When the clutch stroke exceeds a predetermined amount (a meet point, such as 70%), the circular plates 30a and 30b separate from each other. As a result, an operating state of the clutch device 30 becomes a state in which the transmission of motive power from the crank shaft 18 to the MT 32 is blocked (motive power blocked state). On the other hand, when the clutch stroke is the meet point or less, the circular plates 30a and 30b come into contact with each other. As a result, the operating state of the clutch device 30 becomes a state in which the motive power transmitted from the crank shaft 18 to the MT 32 (clutch-meet state).

The MT 32 is a stepped manual transmission in which transmission gear ratio is manipulated by a shift position of a shift device (not shown) being manually operated by the driver. The MT 32 is configured to include forward gears in a plurality of levels (such as one- to five-speed), a neutral gear (N), and the like. In the MT 32, the rotation speed of the input shaft 34 changes to a rotation speed adhering to the transmission gear rate. As a result of the shift position being set to first to fifth speeds (drive state), the MT 32 enters a state capable of transmitting the rotative power from the crank shaft 18 to a driving wheel 42, via the output shaft of the MT 32 (not shown), a differential gear 38, a drive shaft 40, and the like. On the other hand, as a result of the shift position being set to neutral, the MN 32 enters a state unable to transmit the rotative power to the driving wheel 42.

A brake 44 is provided near each wheel including the driving wheel 42. The brake 44 applies braking force to the wheels. Specifically, the braking force applied to the wheels by the brake 44 increases by hydraulic pressure (brake hydraulic pressure) in a brake hydraulic system increasing as a result of increase in the depression amount (brake stroke) of a brake pedal 46 by the driver or an electric brake actuator 48 being driven. A hydraulic sensor 50 that detects the brake hydraulic pressure (such as master cylinder pressure) is provided in the brake hydraulic system.

An electronic control unit (ECU 52, hereinafter) that operates the engine system is mainly configured by a microcomputer composed of a known central processing unit (CPU), read-only memory (ROM), and random access memory (RAM). The ECU 52 receives input of output signals from a clutch sensor 54 that detects the clutch stroke, a brake sensor 56 that detects the brake stroke, an accelerator sensor 60 that detects a depression amount of an accelerator pedal 58, a shift position sensor 62 that detects the above-described shift position of the shift device, a speed sensor 64 that detects a traveling speed of the vehicle, the hydraulic sensor 50, the crank angle sensor 20, and the like. The ECU 52 runs various control programs stored in the ROM in adherence to the inputted signals, thereby performing a combustion control process including a fuel injection control process by the fuel injection valve 12 and an ignition control process by the ignition device 14, an idle-stop control process, and the like.

The idle-stop control process automatically stops the engine 10 by stopping fuel injection from the fuel injection valve 12 and the like when predetermined stop conditions are met. Subsequently, the idle-stop control process restarts the engine 10 by driving the starter 22 and performing the combustion control process when predetermined restart conditions are met. Here, a restart process will be described with reference to FIG. 2. First, at time t1 at which the restart conditions are met, the ECU 52 starts driving the starter 22 (energizing the switch section 22b and the motor 22c) to start cranking. In addition, the ECU 52 starts the combustion control process to perform fuel injection from the fuel injection valve 12 and generate the discharge spark from the spark plug 14a. Then, at time t2 at which engine speed NE is judged to be a self-sustained drive enabling speed Nα (a rotation speed set within a range of, for example, 400 rpm to 500 rpm) or higher based on an output value from the crank angle sensor 20, the ECU 52 stops driving the starter 22. Specifically, as the engine speed NE used for drive-stop judgment of the starter 22 herein, a minimum value (such as the engine speed NE at a compression upper dead point) of the engine speed NE that varies with a compression upper dead point interval as a variation period may be used. The self-sustained drive enabling speed Nα is a rotation speed at which the engine 10 can be driven by only the engine torque generated by combustion of the air-fuel mixture by the combustion control process, without cranking being performed. In other words, the self-sustained drive enabling speed Nα is a rotation speed at which forward rotation of the crank shaft 18 can be continued as a result of torque applied to the crank shaft 18 in a direction rotating the crank shaft 18 in the forward direction overcoming torque applied to the crank shaft 18 in a direction obstructing the forward rotation of the crank shaft 18, attributed to pumping loss, friction loss, and the like. The restart of the engine 10 by the combustion control process is then completed.

The stop conditions are determined such as to enable recognition of the intent of the driver to stop the vehicle. According to the first embodiment, the stop conditions prescribe that a logical product of a condition that the traveling speed of the vehicle based on the output value of the speed sensor 64 is a predetermined speed (such as zero or a predetermined speed higher than zero) or lower, a condition that the operating state of the clutch device 30 is the motive power blocked state, and the like is true. Specifically, whether or not the clutch device 30 is in the motive power blocked state can be determined by judgment of whether or not the clutch stroke based on the output value of the clutch sensor 54 is a clutch stroke (100%) equivalent to a full depression position, or is a first threshold value ST1 or more. The first threshold value ST1 is a value greater than the meet point and slightly less than the clutch stroke equivalent to the full depression position.

On the other hand, the restart conditions prescribe that a logical sum of the following conditions (A) to (C) is true. These conditions are determined from a perspective of improving fuel saving effects achieved by idle-stop control by extending an automatic stop time of the engine 10 as much as possible, based on a series of operation aspects of various operation members (such as the clutch pedal 36 and the brake pedal 46) expected when the driver starts to move the vehicle.

(A) In a state in which the operating state of the clutch device 30 is the motive power blocked state and the shift position is in the drive state (such as first speed), the depressing operation of the brake pedal 46 is released. Here, whether or not the shift position is in the drive state may be judged based on the output value from the shift position sensor 62. Whether or not the depressing operation of the brake pedal 46 has been released may be judged, for example, depending on whether or not the brake stroke based on the output value from the brake sensor 56 is zero.

(B) In a state in which the operating state of the clutch device 30 is the motive power blocked state and the brake pedal 46 is not depressed, the shift position enters the drive state. It is noted whether or not the brake pedal 46 is depressed may be judged based on whether or not the brake stroke is greater than zero.

(C) A logical product is true for: a condition that, in a state in which the shift position is in the drive state and the brake pedal 46 is being depressed, an operation for releasing the depression of the clutch pedal 36 (clutch release) is performed; and a condition that a clutch release speed is low. It is noted that whether or not the clutch release is performed may be judged based on whether or not the clutch stroke is less than a second threshold value ST2 (such as 85%) that is a value smaller than the first threshold value ST1 and greater than the meet point. The second threshold value ST2 is set based on a viewpoint that the second threshold value ST2 is set to as large a value as possible to secure time expected to be required for the engine speed NE to become the self-sustained drive enabling speed Nα or higher after cranking is started by the restart process, and a viewpoint that a prescribed value Δ can be set for recognizing the intent of the driver to move the vehicle under the condition regarding the clutch release speed, described hereafter.

Of the condition (C), the condition regarding the clutch release speed is provided to enable the intent of the driver to move the vehicle to be recognized as accurately as possible. In other words, for example, during automatic stop of the engine 10 when the shift position is the drive state, the operating state of the clutch device 30 is the motive power blocked state, and the brake pedal 46 is being depressed, the driver may mistakenly think that the engine 10 is being stopped by operation of the ignition key 24. As a result, the driver may accidentally release depression of the clutch pedal 36. In this instance, the restart process of the engine 10 may be performed as a result of the restart conditions being met, regardless of the driver having no intention of moving the vehicle. When the driver intends to move the vehicle, clutch release is performed slowly such as by a half-clutch operation being performed. On the other hand, when the driver does not intend to move the vehicle, the depression release of the clutch pedal 36 tends to be performed at once. As a result of providing the condition regarding the clutch release speed with focus on this point, a situation in which the engine 10 is restarted when the driver does not intend to move the vehicle can be prevented as much as possible. As shown in FIG. 3, whether or not the clutch release speed is low may be judged based on whether or not the time (release time Δt) required for the clutch stroke ST to become less than the second threshold value ST2 after becoming less than a third threshold value ST3 (such as 90%) that is a value greater by the prescribed value Δ (such as 5%) than the second threshold value ST2 is longer than a judgment time Tjde. The judgment time Tjde may be set based on an experiment conducted in advance or the like, as time enabling differentiation of the release time (fastest release time, time t1 to time t2) when the clutch pedal 36 that is fully depressed is released at once, and the release time when the driver intends to move the vehicle (time t3 to time t4). Specifically, the judgment time Tjde is set to a time longer than the fastest release time and shorter than the release time when the driver intends to move the vehicle.

Although the restart conditions are set as described above, the restart process of the engine 10 may be performed regardless of the driver not intending to move the vehicle. A reason for this is that, even when the restart conditions are used, a situation occurs in which accurate recognition cannot be made of the driver not intending to move the vehicle. In other words, for example, although the condition (C) of the restart conditions includes the condition regarding the clutch release speed to recognize the intent of the driver to move the vehicle, depending on an aspect in which the driver accidentally releases the depression of the clutch pedal 36, an erroneous judgment may made that the driver intends to move the vehicle regardless of the driver not intending to move the vehicle. As an aspect in which the driver releases the depression of the clutch pedal 36 such as that above, for example, as shown in FIG. 3, an aspect is given in which, although the release time Δt (time t3 to time t4) is judged to be longer than the judgment time Tjde, the clutch release speed subsequently increases, as shown by the dashed lines in FIG. 3.

Regardless of the driver not intending to move the vehicle, when the time required until the clutch stroke ST reaches the meet point is shorter than the time required from the start of cranking until the engine speed NE reaches the self-sustained drive enabling speed Nα, after the restart process is started as a result of the release time Δt being judged to be longer than the judgment time Tjde, as shown by the dashed lines in FIG. 3, the operating state of the clutch device 30 may become the clutch-meet state at time t5 during the period in which cranking is being performed. When the operating state of the clutch device 30 becomes the clutch-meet state during the period in which cranking is being performed, the vehicle may start to move regardless of the driver not intending to move the vehicle as a result of the driving force of the starter 22 being transmitted to the driving wheel 42 and being used for power-running of the vehicle. In addition, reliability of the starter 22 may decrease as a result of the driving force of the starter 22 being used for power-running of the vehicle. Specifically, when the operating state of the clutch device 30 becomes the clutch-meet state, the force in the direction obstructing the forward rotation of the crank shaft 18 is applied to the crank shaft 18 and the degree of increase in the engine speed NE decreases, or the like. As a result, the time required from when cranking is started until the engine speed NE rises to the self-sustained drive enabling speed Nα may increase. In this instance, as a result of the drive time of the starter 22 increasing, deterioration of the starter 22 may advance.

Even when the driver intends to move the vehicle, depending on the operation aspect of the clutch pedal 36 by the driver, the operating state of the clutch device 30 may become the clutch-meet state during the period in which cranking is being performed. Specifically, for example, although the restart process of the engine 10 is started as a result of the above-described condition (A) or (B) being met, as a result of the subsequent clutch release speed becoming fast, the operating state may become the clutch-meet state during the period in which cranking is being performed.

To solve such issues, according to the first embodiment, when the transition of the operating state of the clutch device 30 from the motive power blocked state to the clutch-meet state before the engine speed NE reaches self-sustained drive enabling speed Nα is determined or predicted after cranking is started by the restart process, a forced stop process is performed to forcibly stop both driving of the starter 22 and the combustion control process. The forced stop process will hereinafter be described with reference to FIG. 4 to FIG. 7.

First, stopping both the driving of the starter 22 and the combustion control process will be described.

The timing at which the discharge spark is generated by the spark plug 14a (ignition timing) is adjusted by, for example, an experiment conducted in advance, such that pressure within the combustion chamber (cylinder internal pressure) reaches maximum after a compression upper dead point as a result of an explosive power generated by the combustion of fuel, under a circumstance in which the engine speed enters a steady state. Here, when the driving of the starter 22 is stopped, the rotation of the crank shaft 18 (ring gear 28) is not immediately stopped. The crank shaft 18 continues to rotate by inertia while reducing rotation speed as a result of pumping loss and the like. Under such circumstances, when the combustion control process is continued, the timing at which the cylinder internal pressure reaches maximum as a result of the explosive power generated by combustion may shift from the timing after the compression upper dead point to timing before the compression upper dead point. Specifically, although an OFF ignition signal is outputted and ignition is performed to actualize ignition timing appropriate for the initial engine speed, the engine speed subsequently decreases. As a result of the subsequent decrease in engine speed, the actual ignition timing of the air-fuel mixture may be shifted to the advance side than the initially expected ignition timing. The timing at which the cylinder internal pressure reaches maximum may also shift to the timing before the compression upper dead point. In this instance, because the explosive power applied to the crank shaft 18 is power in a direction rotating the crank shaft 18 in reverse, a phenomenon may occur in which the crank shaft 18 rotates in reverse (backfire).

On the other hand, even when energization of the switch section 22b is stopped to stop driving the starter 22, the meshing between the pinion 22a and the ring gear 28 may not be immediately released. When backfire occurs under a circumstance in which the meshing of the pinion 22a and the ring gear 28 is not released, the power in the direction rotating the crank shaft 18 in reverse is transmitted from the ring gear 28 to the pinion 22a that is rotating by inertia in the direction rotating the crank shaft 18 in the forward direction after energization to the motor 22c is stopped. As a result, the pinion 22a and the shaft (pinion shaft) rotatably driving the pinion 22a may become damaged or the like, and the reliability of the starter 22 may decrease. Therefore, backfire is prevented from occurring by both driving of the starter 22 and the combustion control process being stopped.

Even when the combustion control process is stopped in this instance, backfire may occur when the timing at which the process is stopped is within a period from when the ON ignition signal is outputted until the compression upper dead point is reached for the following reason. That is, when energization of the primary coil 14d of the ignition device 14 is once started, even when the energization is subsequently blocked, the discharge spark may be generated by the spark plug 14a while the energization is blocked. Therefore, according to the first embodiment, as the forced stop process, the process for stopping both driving of the starter 22 and the combustion control process is performed such as to avoid a stop prohibited period that includes at least a period from when the ON ignition signal is outputted until the compression upper dead point is reached. Specifically, when the operating state is judged to transition to the clutch-meet state during a period other than the stop prohibited period, the driving of the starter and the combustion control process are both forcibly stopped at the judgment timing.

FIG. 4A and FIG. 4B show examples of the stop prohibited period. Specifically, FIG. 4A and FIG. 4B show: a period (first stop prohibited period) from a fuel injection amount calculation start timing (time t1) in an air intake step to a timing at which the compression upper dead point is reached (time t4); a period (second stop prohibited period) from a timing at which the fuel injection from the fuel injection valve 12 is started (time t2) to the timing at which the compression upper dead point is reached; and a period (third stop prohibited period) from a timing at which the ON ignition signal is outputted (time t3) to the timing at which the compression upper dead point is reached.

When the operating state of the clutch device 30 transitions to the clutch-meet state during the period from when the ON ignition signal is outputted to when the compression upper dead point is reached, the ignition of the fuel injected from the fuel injection valve 12 cannot be stopped. Therefore, to prevent such a situation, according to the first embodiment, a prediction process is performed for predicting whether or not the operating state will transition to the clutch-meet state during the stop prohibited period, at a timing (prediction timing) immediately before the stop prohibited period.

When predicted that the operating state will transition to the clutch-meet state, the process for forcibly stopping both driving of the starter 22 and the combustion control process is performed at the prediction timing. The prediction process will hereinafter be described with reference to FIG. 5A to FIG. 5D. Specifically, FIG. 5A shows the transition of clutch stroke ST; FIG. 5B shows the transition of the driving state of the starter 22; FIG. 5C shows the transition of the combustion control process state; and FIG. 5D shows the transition of engine speed NE.

As shown in FIG. 5A to FIG. 5D, whether or not the operating state of the clutch device 30 will transition from the motive power blocked state to the clutch-meet state during the stop prohibited period is predicted based on the clutch stroke ST and the speed of reduction of the clutch stroke ST at the prediction timing (time t2) after time t1 at which the restart process is started. Specifically, as shown in FIG. 5A, when judged that an amount of time (time t2 to t3) calculated by a value that is the clutch stroke ST at the prediction timing subtracted by the meet point, further divided by the speed of reduction is shorter than an amount of time (time t2 to t4) equivalent to the stop prohibited period associated with the rotation angle position of the crank angle 18, a prediction is made that the operating state of the clutch device 30 will transition to the clutch-meet state during the stop prohibited period. When predicted that the operating state will transition to the clutch-meet state, both driving of the starter and the combustion control process are forcibly stopped at the prediction timing. As a result, the rotation of the crank shaft 18 is subsequently stopped.

On the other hand, as indicated by B in FIG. 5A to FIG. 5D, when judged that the calculated amount of time is the amount of time equivalent to the stop prohibited period or more, a prediction is made that the operating state will not transition to the clutch-meet state during the stop prohibited period. When predicted that the operating state will not transition to the clutch-meet period, driving of the starter 22 and the combustion control process are both continued at least for the duration of the stop prohibited period.

The shorter the stop prohibited period is, the higher the prediction accuracy is regarding whether or not the operating state transitions to the clutch-meet state during this period. A reason for this is that, the shorter the stop prohibited period is, the smaller the possibility is of the speed of reduction of the clutch stroke ST after the prediction timing shifting from that at the prediction timing. The amount of time equivalent to the stop prohibited period is calculated based on the engine speed.

Specifically, for a first prediction timing from the start of cranking, the amount of time equivalent to the stop prohibited period is calculated based on the minimum value (such as 100 rp,) of the engine speed expected at the initial stage of driving of the starter 22. On the other hand, for second and subsequent prediction timings, the equivalent amount of time is calculated based on the engine speed at a previous compression upper dead point. A reason for using the engine speed at the previous compression upper dead point is to overestimate the amount of time equivalent to the stop prohibited period to prevent occurrence of a situation in which an erroneous prediction that the operating state will not transition to the clutch-meet state is made, when in fact the operating state does transition to the clutch-meet state during the stop prohibited period. In other words, the behavior of the engine speed during the period in which cranking is performed is such that the engine speed rises while periodically changing such that the engine speed is a minimum value at the compression upper dead point.

Therefore, depending on the engine speed at the prediction timing described above, as a result of the amount of time equivalent to the stop prohibited period being calculated as being shorter, the erroneous prediction that the operating state will not transition to the clutch-meet state may be made, when in fact the operating state does transition to the clutch-meet state during the stop prohibited period. Therefore, the amount of time equivalent to the stop prohibited period can be overestimated and erroneous predictions can be prevented by using the engine speed at the previous compression upper dead point as the minimum value of the engine speed nearest to the prediction timing.

As shown in FIG. 6A, driving of the starter and the combustion control process are both simultaneously stopped at the above-described prediction timing (time t1) for the following reason. Specifically, as shown in FIG. 6B, when driving of the starter 22 and the combustion control process are both simultaneously stopped at a timing (t2) of the compression upper dead point following the prediction timing, the timing at which the cylinder internal pressure reaches maximum does not shift to before the compression upper dead point as a result of the starter 22 being continuously driven during the stop prohibited period, and backfire does not occur.

However, needless combustion occurs. As shown in FIG. 6C, when the combustion control process is stopped at the prediction timing and driving of the starter 22 is stopped at the timing of the compression upper dead point, although backfire does not occur, the starter 22 is needlessly driven during the stop prohibited period. Furthermore, as shown in FIG. 6D, when driving of the starter 22 is stopped at the prediction timing and the combustion control process is stopped at the timing of the compression upper dead point, backfire occurs because the timing at which the cylinder internal pressure reaches maximum shifts to before the compression upper dead point as a result of the starter 22 not being continuously driven. Therefore, backfire can be appropriately prevented while preventing needless driving of the starter 22 and the like as a result of simultaneously stopping both driving of the starter 22 and the combustion control process at the prediction timing.

When the third stop prohibited period shown in FIG. 4 is used as the stop prohibited period, unlike when the first stop prohibited period or the second stop prohibited period is used, the combustion control process is stopped after fuel injection from the fuel injection valve 12 has started. Therefore, a device or a control process for appropriately handling fuel that has not been combusted is preferably implemented.

Figure 7:
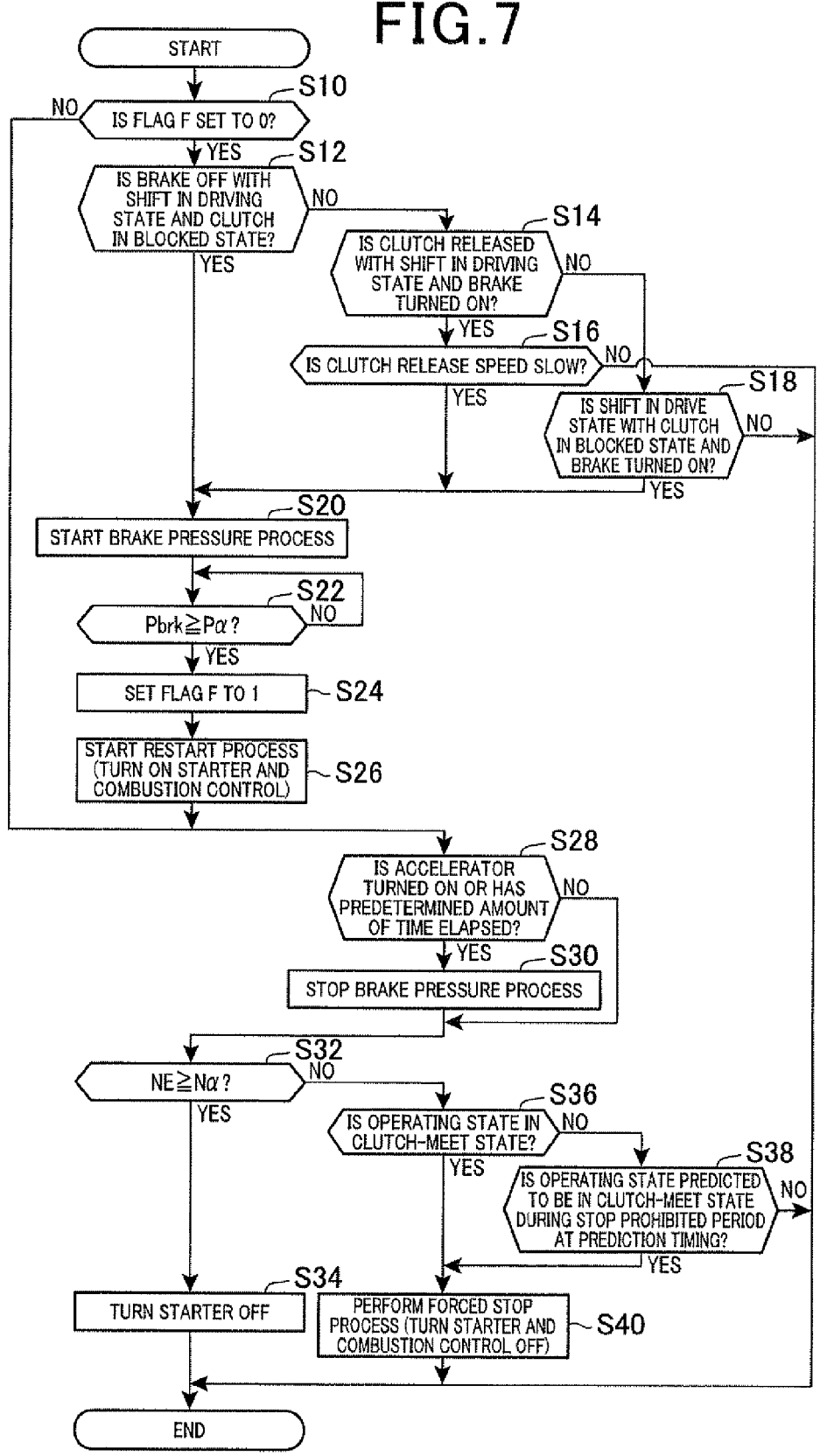
FIG. 7 is a flowchart showing a forced stop process according to the first embodiment.

FIG. 7 shows procedures of the forced stop process according to the first embodiment. The forced stop process is performed by the ECU 52 during automatic stop of the engine 10 at, for example, a predetermined interval.

In the series of processes, at Step S10, the ECU 52 judges whether or not a value of a brake pressure flag F is "0". The value of the brake pressure flag F being set to "0" indicates that a brake pressure process, described hereafter, has not yet been performed. The value being set to "1" indicates that the pressure process has already been performed. The value of the brake pressure flag F is stored in a memory of the ECU 52.

When judged at Step S10 that the value of the brake pressure flag F is "0", the ECU 52 judges whether or not the restart conditions of the engine 10 are met at Step S12 to Step S18. As described above, the restart conditions prescribe that the logical sum of the above-described conditions (A) to (C) is true.

When judged that the restart conditions have been met in the above-described process, the ECU 52 proceeds to Step S20 and starts the brake pressure process for increasing brake hydraulic pressure by performing an operation to energize the brake actuator 48. The brake pressure process is performed to prevent the vehicle from moving (sudden-start of the vehicle) even when the driving force of the starter 22 is used for power-running of the vehicle during the period cranking is performed, by forcibly applying braking force to the wheels.

At subsequent Step S22, the ECU 52 waits until brake hydraulic pressure Pbrk reaches a prescribed pressure Pα or more. The process is performed to judge whether or not sufficient braking force is applied to the wheels. The prescribed pressure Pα is set from the viewpoint of preventing sudden-start of the vehicle with certainty. Specifically, for example, the prescribed pressure Pα is set to brake hydraulic pressure required for achieving brake torque that is several times (such as three-times) the torque transmitted from the engine 10 to the driving wheel 42 while the engine 10 is idling. When the brake hydraulic pressure Pbrk increases to the prescribed pressure Pα, the brake hydraulic pressure Pbrk is maintained at the prescribed pressure Pα or pressure greater than the prescribed pressure Pα by the brake pressure process.

At subsequent Step S24, the ECU 52 sets the value of the brake pressure flag F to "1". Then, at Step S26, the ECU 52 starts the restart process of the engine 10. Specifically, the ECU 52 starts driving the starter 22, thereby starting cranking. The ECU 52 also starts the combustion control process, thereby starting fuel injection from the fuel injection valve 12 and ignition by the ignition device 14 in each cylinder.

When judged NO at Step S10 or when the process at Step S26 is completed, the ECU 52 proceeds to Step S28. The ECU 52 judges whether the logical sum of the condition that the depression operation of the accelerator pedal 58 by the driver is not performed and the condition that a predetermined amount of time has elapsed from the start of the brake pressure process is true. The process is performed to judge whether or not to stop the brake pressure process. The condition related to the operation of the accelerator pedal 58 is provided to appropriately recognize the intent to move the vehicle of the driver and stop the brake pressure process. In other words, when the driver moves the vehicle, the depression operation of the accelerator pedal 58 is performed. Therefore, the braking force applied to the wheels is required to be zero. On the other hand, the condition that the predetermined amount of time has elapsed is provided to prevent reduction in the reliability of the brake actuator 48 caused by the drive time of the brake actuator 48 becoming long. Whether or not the depression operation of the accelerator pedal 58 is performed is judged based on an output value of the accelerator sensor 60. The predetermined time may be set based on evaluation results of an experiment conducted to test the reliability of the brake actuator 48 or the like.

When judged YES at Step S28, the ECU 52 proceeds to Step S30 and stops the brake pressure process. As a result, the brake hydraulic pressure decreases and braking force is no longer applied to the wheels.

When judged NO at Step S28 or when the process at Step S30 is completed, the ECU 52 proceeds to Step S32 and judges whether or not the engine speed NE is the self-sustained drive enabling speed Nα or more.

When judged at Step S32 that the engine speed NE is the self-sustained drive enabling speed Nα or more, the ECU 52 proceeds to Step S34. The ECU 52 stops driving the starter 22 by turning OFF the starter switch 26 or the like and ends cranking. The restart of the engine 10 is then completed.

On the other hand, when judged at Step S32 that the engine speed NE is less than the self-sustained drive enabling speed Nα, the ECU 52 proceeds to Step S36. The ECU 52 judges whether or not the operating state of the clutch device 30 has transitioned from the motive power blocked state to the clutch-meet state. Whether or not the operating state has transitioned to the clutch-meet state can be determined based on whether or not the clutch stroke ST is the meet point or less.

When judged at Step S36 that the operating state has not transitioned to the clutch-meet state, the ECU 52 proceeds to Step S38. The ECU 52 predicts at the prediction timing whether or not the operating state of the clutch device 30 will transition to the clutch-meet state during the stop prohibited period.

When judged YES at Step S36 or when a prediction is made that the operating state will transition to the clutch-meet state during the stop prohibited period at Step S38, the ECU 52 proceeds to Step S40. The ECU 52 performs the forced stop process for stopping both driving of the starter 22 and the combustion control process. In other words, the restart process of the engine 10 is interrupted at the judgment timing at Step S36 or the prediction timing at Step S38 (avoiding the stop prohibited period). Cranking by the starter 22 is interrupted, and fuel injection and ignition in each cylinder is stopped.

When the restart process of the engine 10 is interrupted, a process is preferably performed to notify the driver of the interruption. Specifically, for example, a process is performed to notify the driver by displaying the notification on an instrument panel or the like, or by using sound. The value of the brake pressure flag F is set to "0" when the brake pressure process is stopped.

When judged NO at Step S16, Step S18, or Step S38, or when the process at Step S34 or Step S40 is completed, the series of processes is once completed.

According to the first embodiment, described in detail above, the following effects can be achieved.

(1) When judged that the operating state of the clutch device 30 transitions to the clutch-meet state before judged that the engine speed NE is the self-sustained drive enabling speed Nα or more, the forced stop process is performed to forcibly stop both driving of the starter 22 and the combustion control process at the judgment timing. As a result, the occurrence of defects attributed to the driving force of the starter 22 being used for power-running of the vehicle, such as sudden-start of the vehicle and reduced reliability of the starter 22, can be prevented. In addition, the occurrence of backfire can be appropriately prevented by the forced stop processing. Therefore, reduced reliability of the starter 22 caused by backfire can be appropriately prevented. Furthermore, effects can be expected such as, when the forced stop process is performed when the user intends to move the vehicle, the driver is prompted to amend depression aspect of the clutch pedal 36 such that engine stalling caused by the forced stop process does not occur during subsequent engine restart, or in other words, the operating state of the clutch device 30 does not transition to the clutch-meet state during the period in which cranking is performed.

(2) When a period including at least a period from when the ON ignition signal is outputted until the compression upper dead point is reached is set as the stop prohibited period and a prediction is made at the prediction timing that the operating state will transition to the clutch-meet state during the stop prohibited period, driving of the starter 22 and the combustion control process are both forcibly stopped at the prediction timing. As a result, defects and the occurrence of backfire caused by the drive torque of the starter 22 being used for power-running of the vehicle can be appropriately prevented. In addition, a situation in which driving of the starter 22 and the combustion control process are needlessly continued can be prevented.

Second Embodiment

A second embodiment will hereinafter be described with reference to the drawings, mainly focusing on differences with the first embodiment.

Figure 8:
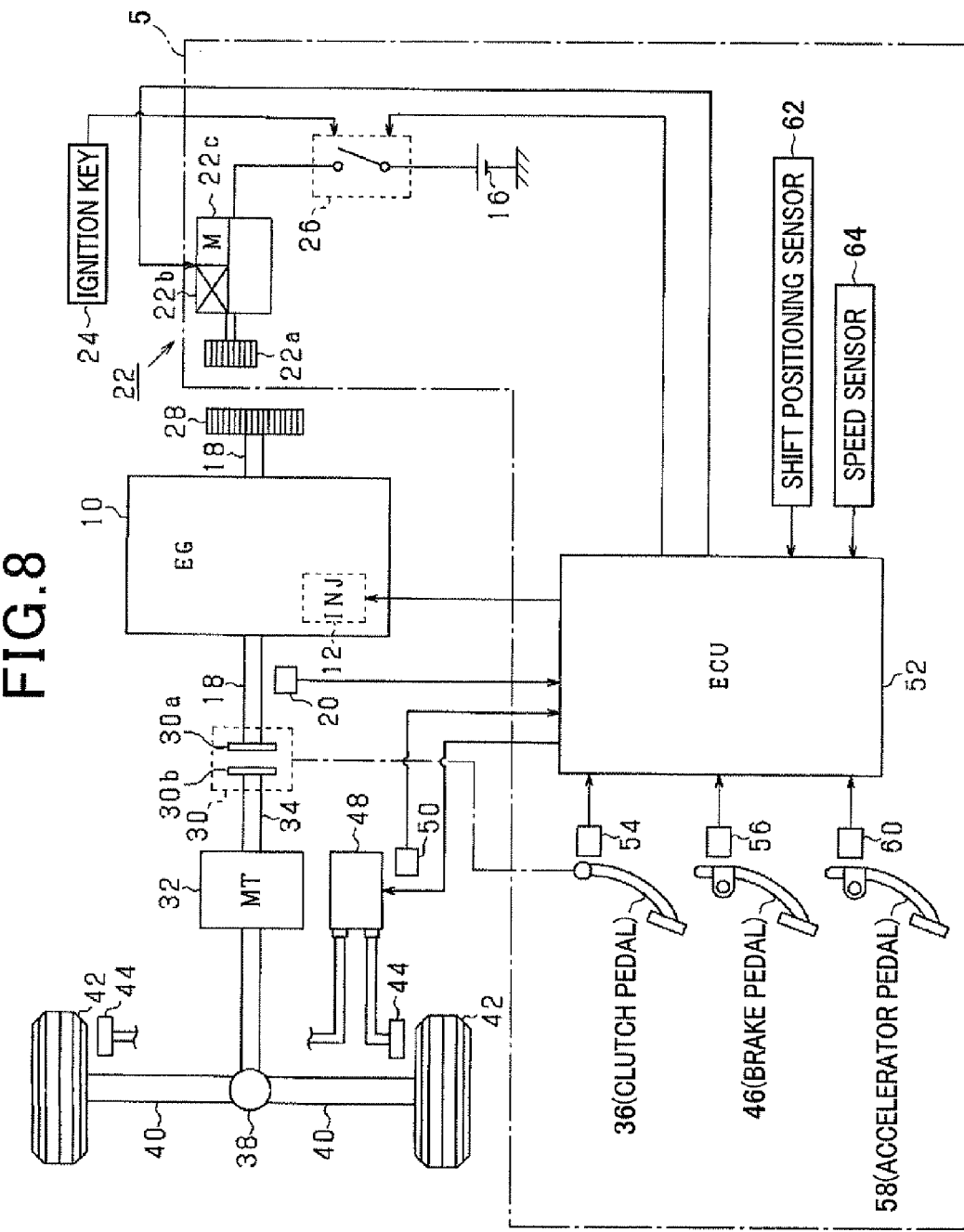
FIG. 8 is a system configuration diagram according to a second embodiment.

A system configuration according to the second embodiment will be described with reference to FIG. 8.

According to the second embodiment, the engine 10 is assumed to be a compression-ignited internal combustion engine (diesel engine). Therefore, comparing to the first embodiment, the ignition device 14 is omitted in the system configuration of the second embodiment.

The fuel injection valve 12 for supplying fuel (diesel oil) to a combustion chamber of the engine 10 by direct injection is provided in each cylinder of the engine. The fuel injected into the combustion chamber from the fuel injection valve 12 is self-ignited by compression in the combustion chamber and combusted. The fuel is supplied to the fuel injection valve 12 from an accumulator (common rail) (not shown) that accumulates the fuel in a high-pressure state.

The ECU 52 performs a fuel injection control process to perform an operation to energize the fuel injection valve 12 such as to supply fuel from the fuel injection valve 12 to a single cylinder by a plurality of injections (multi-stage injection) during a single combustion cycle. According to the second embodiment, a pilot injection, a pre-injection, and a main injection are performed as the multi-stage injection. The pilot injection and the subsequent pre-injection are performed for the purpose of promoting mixture of fuel and air immediately before ignition by injecting miniscule amounts of fuel. The pilot injection and the pre-injection also serve to suppress generation of nitrogen oxide ($NO_x$) by shortening delay in ignition timing after the main injection, and reducing combustion noise and vibrations. On the other hand, the main injection is performed after the pre-injection. The main injection contributes to the generation of torque in the engine 10 and has the largest injection amount among the multiple stages of injection. Specifically, in the fuel injection control process, first, the fuel injection amount, the injection duration of each injection, the time interval between each injection, and the like required for a single combustion cycle to actualize generation of the required engine torque during the first half of a compression step are calculated based on the engine speed and the like. Then, based on the calculated pieces of information, the ECU 52 energizes the fuel injection valve 12 and performs the desired multi-stage injection from the fuel injection valve 12.

Next, the forced stop process according to the second embodiment will be described.

According to the second embodiment, when the period including at least the period from the main injection start timing to the timing at which the compression upper dead point is reached is set as the stop prohibited period, and a judgment or a prediction is made that the operating state of the clutch device 30 transitions to the clutch-meet state before the engine rotation speed NE becomes the self-sustained drive enabling speed Nα or more, both driving of the starter 22 and the fuel injection control process are forcibly stopped at a timing avoiding the stop prohibited period. It is noted that both driving of the starter 22 and the fuel injection control process are stopped for the following reason. In other words, the injection timing of the main injection and the like is adjusted by conducting an experiment or the like in advance, such that the cylinder internal pressure reaches maximum after the compression upper dead point under a circumstance in which the engine speed enters a steady state. As a result of the engine speed decreasing as a result of driving of the starter 22 being stopped, the timing at which the cylinder internal pressure reaches maximum is shifted to a timing before the compression upper dead point by combustion of the fuel of the main injection. As a result, backfire may occur. Therefore, the occurrence of backfire is prevented by stopping both driving of the starter 22 and the fuel injection control process.

In addition, the stop prohibited period is set as described above for the following reason. In other words, even when the fuel combustion control process is stopped, when the timing at which the process is stopped is during the period from the main injection start timing to the timing at which the compression upper dead point is reached, the fuel may be ignited as a result of the main injection having already been performed and backfire may occur. Therefore, the stop prohibited period is set as described above to prevent backfire.

FIG. 9 shows examples of the stop prohibited period according to the second embodiment. Specifically, FIG. 9 shows: a period (first stop prohibited period) from a fuel injection amount calculation start timing (time t1) during the compression step to a timing at which the compression upper dead point is reached (time t4); a period (second stop prohibited period) from a pilot injection start timing (time t2) to the timing at which the compression upper dead point is reached; and a period (third stop prohibited period) from a main injection start timing (time t3) to the timing at which the compression upper dead point is reached. When the third stop prohibited period is used, unlike when the first or second stop prohibited period is used, the fuel injection control process is stopped after the main injection has been performed. Therefore, a device or a control process for appropriately handling fuel that has not been combusted is preferably implemented. In addition, when the third stop prohibited period is used, although the pilot injection and the pre-injection have been performed, the fuel injection amounts by these injections are minimal. Therefore, the fuel is not ignited.

As described above, according to the second embodiment, the stop prohibited period can be appropriately set and the forced stop process can be appropriately performed for a diesel engine.

Other Embodiments

Each of the above-described embodiments may be modified as follows.

The method of judging (predicting) whether or not the operating state of the clutch device 30 will transition from the motive power blocked state to the clutch-meet state is not limited to that described according to the first embodiment. For example, the operating state can be judged (predicted) to transition to the clutch-meet state when the clutch stroke ST is judged to be a predetermined threshold value or less, the threshold value being a value less than the meet point. In this instance, because the amount time from when cranking is started by the restart process until the operating state transitions to the clutch-meet state is long, the frequency of engine stall occurring as a result of the forced stop process during the period in which cranking is performed is considered to decrease. Therefore, prevention of reduction in drivability for the driver who intends to move the vehicle can be expected. However, in this instance, the frequency at which the driving force of the starter 22 used for power-running of the vehicle is considered to increase. Therefore, from the viewpoint of maintaining reliability of the starter 22, the above-described predetermined threshold value is preferably set such that the torque (clutch capacity) transmitted from the crank shaft 18 to the input shaft 34 of the MT 32 via the clutch device 30 does not become excessively large.

The spark-ignition engine is not limited to that according to the first embodiment, and may for example be a port-injection-type.

The brake is a hydraulic-type according to the first embodiment. However, it is not limited thereto and may be, for example, an air-type.

The method of preventing sudden-start of the vehicle is not limited to applying braking force on the wheels by the brake pressure process. Other methods capable of preventing sudden-start of the vehicle may be used.

According to the first embodiment, the brake pressure process is not required to be used. In this instance as well, when the operating state of the clutch device 30 is judged (predicted) to transition to the clutch-meet state under a circumstance in which the engine speed is less than the self-sustained drive enabling speed Nα, the starter 22 is prevented from being forcibly stopped. Therefore, sudden-start of the vehicle can be suppressed. When the brake pressure process is not performed, in the process shown in FIG. 7, the processes at Step S20 and S22 are omitted. In addition, the flag F is set to "0" in the process at Step S10 to indicate that the restart conditions have not yet been met, and is set to "1" to indicate that the restart conditions have already been met.

What is claimed is:

1. A device for controlling an automatic start of an engine mounted on a vehicle provided with a clutch producing two states including a transmitting state where a motive power is transmitted to a driving wheel of the vehicle from an output shaft of the engine by operating a clutch member operated by a driver and a blocking state where the motive power is blocked between the output shaft and the driving wheel by operating the clutch member operated by the driver, and a brake to stop wheels including the driving wheel from rotating by a braking operation of a brake member, the device comprising:

an automatic restart processing adapted to restart the engine by driving a starter to perform cranking the engine, the automatic restart processing being performed when predetermined restart conditions are met during automatic stop of the engine;

determining means for determining whether or not a transition of the state from the blocking state to the transmitting state occurs while the cranking is being performed, based on a state of the clutch member after the cranking is started by the automatic restart processing during the blocking state; and forced stopping means for forcibly stopping driving of the starter when the determining means determines the transition of the state, wherein the restart condition includes a condition in which the clutch member is operated to allow the state of the clutch to be the transmitting state during the blocking state and a condition in which the braking operation of the brake member is released during the blocking state, the automatic restart processing performs the cranking by driving the starter and a combustion control process including at least a process for supplying fuel to a combustion chamber of the engine from a fuel injection valve, and the forced stopping means forcibly stops both driving of the starter and the combustion control process when the determining means determines the transition of the state where the blocking state changes to the transmitting state, and the device includes a setting means for setting a stop prohibited period including a period from a timing at which ignition of the fuel supplied from the fuel injection valve cannot be stopped to a timing at which a compression upper dead point is reached, and the determining means includes a predicting means for predicting whether or not the state of the clutch changes to the transmitting state from the blocking state during the stop prohibited period, and the forced stopping means forcibly stops both driving of the starter and the combustion control process before the stop prohibited period when the predicting means predicts that the state of the clutch will change to the transmitting state from the blocking state.

2. The device according to claim 1, wherein the engine is configured as a spark-ignition engine including an ignition device that energizes a primary coil of an ignition coil and then stops energization so that induced electromotive force is generated in a secondary coil of the ignition coil, thereby generating a discharge spark in a spark plug, and the combustion control process includes a process in which an operation is performed to energize the ignition device to generate the discharge spark in the spark plug during a compression step, and the setting means is adapted to set a stop prohibited period including a period from a timing at which energization of the primary coil is started to a timing at which a compression upper dead point is reached.

3. The device according to claim 1, wherein the engine is configured as a compression-ignited engine, and the setting means is configured to set a stop prohibited period including a period from a timing at which supply of fuel contributing to the generation of torque in the engine is started by the process for supplying fuel to the timing at which a compression upper dead point is reached.

4. The device according to claim 1, wherein the transition of the state where the blocking state changes to the transmitting state indicates start of transition of the motive power between the output shaft and the driving wheel triggered by the clutch.

5. The device according to claim 1, wherein the automatic restart processing performs cranking by driving the starter until a rotation speed of the output shaft reaches a rotation speed enabling continued rotation of the output shaft by only torque generated by combustion of the fuel supplied to the combustion chamber of the engine.

* * * * *